United States Patent
Perez Madueno et al.

(10) Patent No.: US 8,048,246 B2
(45) Date of Patent: Nov. 1, 2011

(54) METHOD FOR ULTRASOUND WELDING AND CONSTRUCTION MODULE, PARTICULARLY MOTOR VEHICLE DOOR MODULE

(75) Inventors: Jose Luis Perez Madueno, Corbera/Barcelona (ES); Rafel Pelach i de Ribot, Girona (ES); Joaquin Martin Perez, Barcelona (ES)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 649 days.

(21) Appl. No.: 12/160,512

(22) PCT Filed: Jan. 18, 2007

(86) PCT No.: PCT/EP2007/050485
§ 371 (c)(1),
(2), (4) Date: Sep. 24, 2008

(87) PCT Pub. No.: WO2007/085560
PCT Pub. Date: Aug. 2, 2007

(65) Prior Publication Data
US 2010/0175329 A1    Jul. 15, 2010

(30) Foreign Application Priority Data
Jan. 26, 2006 (DE) .......... 10 2006 003 942

(51) Int. Cl.
*B32B 37/00* (2006.01)
(52) U.S. Cl. .............. 156/73.1; 156/580.2
(58) Field of Classification Search ........ 156/73.1, 156/580.1, 580.2; 264/442, 443, 445; 425/174.2
See application file for complete search history.

(56) References Cited

U.S. PATENT DOCUMENTS

| | | | |
|---|---|---|---|
| 3,499,808 A * | 3/1970 | Obeda | 264/249 |
| 3,562,699 A | 2/1971 | Branden et al. | |
| 4,763,397 A | 8/1988 | Tsukayama | |
| 5,360,499 A * | 11/1994 | Savovic et al. | 156/73.1 |
| 5,411,616 A * | 5/1995 | Desai et al. | 156/73.1 |

(Continued)

FOREIGN PATENT DOCUMENTS
DE    3324995 A1    3/1984
(Continued)

OTHER PUBLICATIONS
International Search Report for PCT/EP2007/050485.
(Continued)

*Primary Examiner* — James Sells
(74) *Attorney, Agent, or Firm* — Matthew B. Dernier, Esq.; Gibson & Dernier LLP

(57) ABSTRACT

The invention relates to a method for ultrasound welding of a first and a second component, whereby the first component contains a recess for the reception of first and second protrusions of the second component, with the following steps: Positioning of the first and the second components so that the first and second protrusions protrude into the recess and touch a floor of the recess, Transmission of an ultrasound oscillation for the generation of a relative movement between the first and the second components, whereby the floor is pressed against the first and second protrusions, so that first protrusion is deformed in a first direction and second protrusion in a direction opposite to the first direction, and that at least a first welding connection between the first protrusion and the floor and a second welding connection between the second protrusion and the floor are formed.

18 Claims, 3 Drawing Sheets

U.S. PATENT DOCUMENTS

| | | | |
|---|---|---|---|
| 5,520,775 A * | 5/1996 | Fischl et al. | 156/580.1 |
| 6,135,778 A | 10/2000 | Ubelein | |
| 6,302,733 B1 | 10/2001 | Sakaguchi et al. | |
| 6,427,386 B1 | 8/2002 | Kalb et al. | |
| 7,030,320 B2 | 4/2006 | Asakura et al. | |

FOREIGN PATENT DOCUMENTS

| | | |
|---|---|---|
| DE | 29813964 U1 | 12/1998 |
| DE | 19934596 A1 | 2/2000 |
| DE | 29823967 U1 | 2/2000 |
| DE | 19854013 C2 | 5/2000 |
| DE | 29923223 U1 | 7/2000 |
| DE | 20002555 U1 | 6/2001 |
| DE | 10104035 A1 | 8/2002 |
| DE | 20314781 U1 | 12/2003 |
| DE | 10349240 A1 | 5/2004 |
| DE | 202005003067 U1 | 5/2005 |
| EP | 0944497 B1 | 9/1999 |
| EP | 0961703 | 12/1999 |
| JP | 02080884 A | 3/1990 |

OTHER PUBLICATIONS

International Preliminary Report on Patentability and Written Opinion for PCT/EP2007/050485.

* cited by examiner

METHOD FOR ULTRASOUND WELDING AND CONSTRUCTION MODULE, PARTICULARLY MOTOR VEHICLE DOOR MODULE

BACKGROUND

The invention relates to a method for ultrasound welding as well as a structure module, which contains components welded to each other, particularly a motor vehicle door module.

Different ultrasound welding methods are known from the state of the art. Generally, electrical oscillations generated by an ultrasound generator are converted into mechanical oscillations of the same frequency and transmitted to a workpiece via a welding tool, a so-called sonotrode. Through the effect of the ultrasound, the form parts to be welded are plasticized at the joint surfaces and welded to each other by application of pressure. As an example, plastic components made of ABS, PMMA, PC, PS, and SAM can be welded to each other. It also is possible to produce welding connections by means of ultrasound welding between plastics and other materials such as metals.

Different sonotrode forms for ultrasound welding are known from the state of the art, for example, from DE 20 2005 003 067 U1, DE 299 23 223 U1, DE 298 23 967 U1, DE 298 13 964 U1, DE 203 14 781 U1, DE 200 02 555 U1, and DE 198 54 013 C2.

It is also possible to produce watertight assemblies by means of ultrasound welding. As an example, DE 199 34 596 A1 shows a connector with watertight construction produced by ultrasound welding, and DE 103 49 240 A1 shows a watertight sealing arrangement of a sheathed cable that is also ultrasound welded.

Compared with this, the task on which this invention is based is to create an improved method for ultrasound welding of components, as well as a structure module that contains components welded to each other, particularly a motor vehicle door module.

SUMMARY OF THE INVENTION

According to the invention, a method for ultrasound welding of first and second components is created, whereby the first component features a recess for the reception of first and second nose-like protrusions of the second component. For the ultrasound welding of first and second components, those are firstly positioned in a way that the first and second protrusions protrude into the recess and touch a floor of the recess. Then, an ultrasound oscillation is transmitted onto the components so that a relative motion occurs between the components. During this, the floor is pressed against the first and second protrusions so that the protrusions are deformed in directions opposite to each other. Through this, corresponding welding connections are created between the protrusions and the floor.

In this case, it is of particular advantage that the resulting welding connection can be produced in a watertight manner. That is particularly the case if each of the welding connections is formed with relatively large surfaces at the sides of the protrusions.

According to one embodiment of the invention, the recess is essentially formed in form of a trapezohedron.

According to one embodiment of the invention, the recess is approximately between 7 mm and 25 mm deep, particularly approximately 15 mm, and has an opening in the range from approximately 4 mm to 32 mm, particularly approximately 8 mm to 16 mm. The wall thickness of the recess may be, for instance, between approximately 1 mm and 6 mm, particularly approximately 3 mm.

According to one embodiment of the invention, the two protrusions are essentially parallel to each other before the welding. The two protrusions can be particularly positioned perpendicularly to the second component.

According to one embodiment of the invention, the two protrusions each have a wall thickness of approximately 1 mm to 6 mm, particularly approximately 3 mm.

According to one embodiment of the invention, the two protrusions have a distance of approximately 0.5 to 0.95 times the opening of the recess.

According to one embodiment of the invention, the two protrusions have approximately the same length.

According to one embodiment of the invention, the ultrasound oscillations are transmitted to the first component by means of a sonotrode. The sonotrode has, for instance, a work surface with a peak that is placed on the backside of the floor between the two protrusions. In this position of the sonotrode, the ultrasound oscillation is transmitted, whereby the sonotrode is pressed to the backside of the floor at the same time.

According to one embodiment of the invention, the work surface is formed wavelike whereby two half waves originate at the peak.

According to one embodiment of the invention, the recess and the protrusions, after their positioning in the recess, as well as the work surface of the sonotrode after putting its peak onto the backside of the floor, are arranged symmetrically.

According to one embodiment of the invention, the first or the second component is a carrier plate at which different components are attached by ultrasound welding. For instance, the carrier plate can be the carrier of a motor vehicle door module.

In a further aspect, the invention relates to a structure module with at least first and second components that are welded to each other. The first component has half-wave formed segments that form, together with the corresponding protrusions of the second component, a welding connection. The welding connections are formed, for instance, with relatively large surfaces at the sides of the protrusions.

According to one embodiment of the invention, the welding connections are watertight.

According to one embodiment of the invention, the structure module is a door module, particularly a motor vehicle door module. Motor vehicle door modules are known from the state of the art, particularly also motor vehicle door modules with a carrier that defines a wet area and a dry area within the motor vehicle door; see, for instance, EP 0 944 497 and EP 0 961 703.

For the attachment of components to the carrier and/or the positioning of the carrier inside the door, the problem of sealing occurs for maintaining a separation between dry and wet areas. According to the state of the art, rubber seals are used for sealing, which causes laborious mounting. In addition, in the course of time, rubber seals may become porous and, therefore, leaky. For this, the present invention creates a remedy in that it facilitates a watertight ultrasound welding for attachment of components to the carrier and/or the attachment of the carrier in the inside of the door.

For instance, different components of a door module can be attached to the carrier by ultrasound welding such as, for example, electrical components, particularly electrical connectors, window lift components, loudspeaker components, components of an operating panel, particularly switching components, and the like.

This creates a cost efficient possibility for the production of a motor vehicle door module, while at the same time the long-term tightness of the door module is improved, since ultrasound welding connections, in contrast to sealing by sealants, are not subjected to aging.

BRIEF DESCRIPTION OF THE DRAWINGS

In the following, embodiments of the invention are explained in more detail with reference to the drawings. The following is shown in.

DETAILED DESCRIPTION OF THE INVENTION

Figure 1:
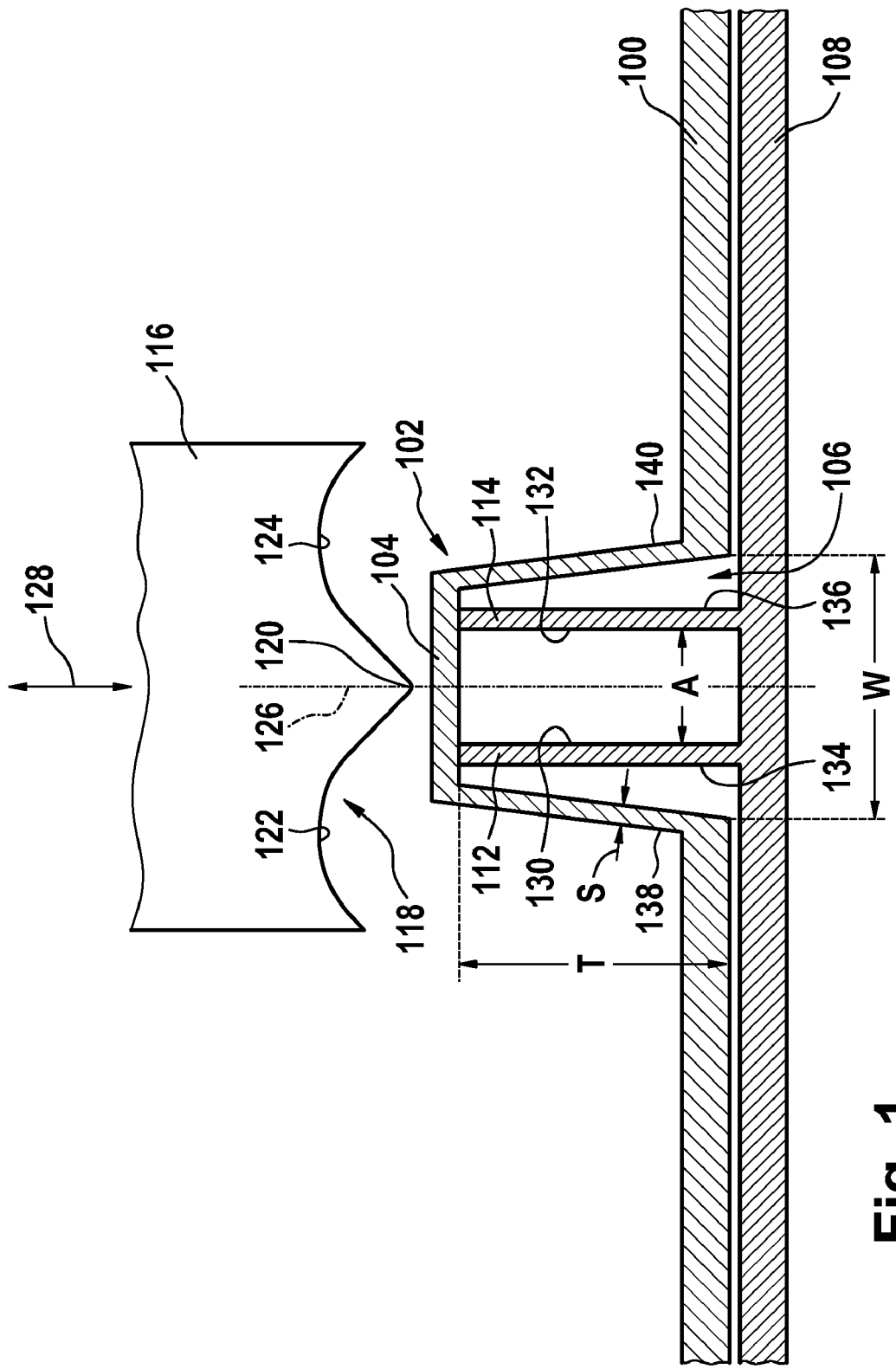
FIG. 1 a cross section of two components to be welded together, before the welding method, FIG. 2 the view of FIG. 1 after welding of the components, FIG. 3 a schematic top view of a motor vehicle door module.

FIG. 1 shows component 100 with recess 102. Recess 102 features, in the embodiment considered here, approximately the shape of a trapezohedron. However, other forms of recess 102 are possible, for instance, rectangular, square, or other geometrical forms.

At the trapezohedron of recess 102, a floor is formed. Floor 104 has a depth T of a few millimeters, for instance, between 7 mm and 25 mm, particularly approximately 15 mm.

Recess 102 forms opening 106 with a width W of a few millimeters, particularly between 4 mm and 32 mm, for instance, between approximately 8 mm and 16 mm. The side ratio between width W to depth T is preferably located in the range between 0.5 and 2.

Wall thickness S is in the range of the recess, particularly in the range of its side flanges 138 and 140, for instance, between 1 mm and 6 mm, particularly approximately 3 mm.

Component 100 may consist, in the area of its recess 102, of a thermoplastic plastic such as, for instance, ABS or another plastic.

Component 108 has two protrusions 112 and 114 of approximately the same length. Protrusions 112 and 114 run essentially parallel to each other and have the same length, which is slightly larger than depth T. The wall thickness of the protrusions can be of the order of magnitude of S.

Figure 2:
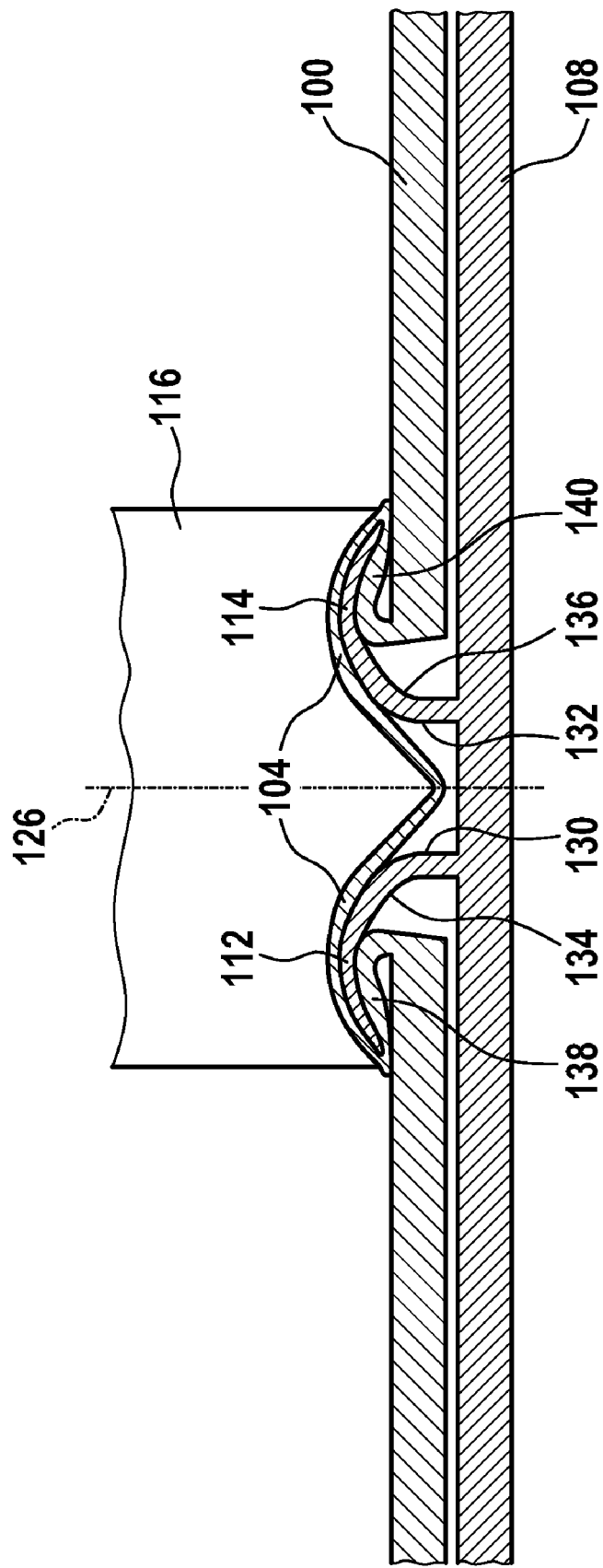

Protrusions 112 and 114 have a distance A from each other, whereby such distance A may be, for instance, approximately 0.5 to 1.0 times the width W of the opening of recess 106. Protrusions 112, 114 of component 108 consist for instance of a thermoplastic plastic such as, for instance, ABS or another plastic. Protrusions 112 and 114 have sides 130, 134 or 132, 136 partial areas of each of them to serve for the formation of joining areas for welding with recess 102, particularly with its side flanges 138, 140 and its floor 104, as shown in FIG. 2.

For the ultrasound welding of components 100 and 108, a sonotrode 116 is used, working area 118 of which is shown in FIG. 1. The working area has a peak 120 from which originate two approximately half-wave shaped areas 122 and 124.

For the ultrasound welding of components 100 and 108, these components are firstly positioned to each other so that protrusions 112 and 114 of component 108 protrude into recess 102 so that they touch floor 104 of recess 102.

Sonotrode 116 is placed with its peak 120 on the backside of floor 104 in approximately the center of floor 104.

Components 100 and 108 are positioned, for instance, in a way that an approximate symmetrical arrangement relative to center axis 126 results for peak 120 of sonotrode 166, placed approximately in the center of the backside of floor 104.

After placement of peak 120 of sonotrode 116, sonotrode 116 is caused to transmit ultrasound oscillations 128 in order to induce a relative movement, particularly between floor 104 and protrusions 112 and 114. This results in the formation of welding connections.

These welding connections are presented in FIG. 2. Protrusion 112 is welded with its side 130 to floor 104 and/or with its side 134 to side flange 138. Likewise, protrusion 114 is welded with its side 132 to floor 104 and/or with its side 136 to side flange 140.

As is also shown in FIG. 2, floor 104 has been deformed by the ultrasound welding method in a way that it has adapted to the form of working area 118 of sonotrode 116. By down pressing of sonotrode 116 to floor 104 during the ultrasound welding method, protrusions 112 and 114 have additionally been bent to the left or the right, respectively, so that they nest with their sides 130 and 132 to floor 104 or with their sides 134 and 136 to the side flanges 138 or 140, so that corresponding welding connections result between floor 104 and protrusions 122, 114.

During the ultrasound welding, side flanges 138 and 140 are also deformed according to working area 118 of the sonotrode and nest to outer sides 134 or 136 of protrusions 112 and 114, so that here, too, welding connections can result.

After switching off ultrasound oscillation 128, it may be, in accordance with the embodiment, advantageous to press sonotrode 116 for several more seconds to floor 104 until the welding connection has hardened.

Figure 3:
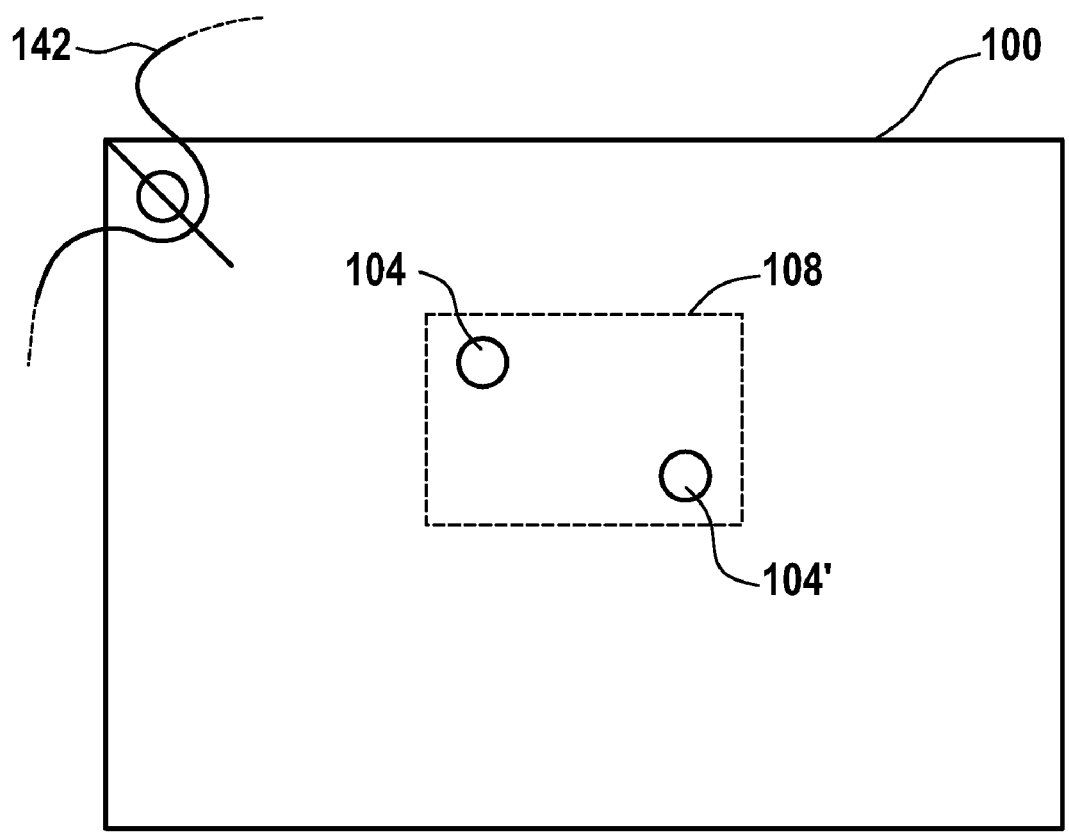

FIG. 3 shows an embodiment of component 100 as carrier plate for a motor vehicle door module. Component 100 serves, for example, for the separation of the wet area from the dry area in the inside of a motor vehicle door.

FIG. 3 shows component 100 in a schematic top view in the direction of the dry area, which means that the front side of component 100, located on the top of FIG. 3, represents the limit for the wet area, while the backside of component 100 defines the dry area.

At the backside of component 100 within the dry area, one or several components 108 may be arranged, whereby component 108 is shown as an example in FIG. 3 by a dashed line. Component 108 can be, for instance, an electrical component, particularly an electrical connector, a window lift component, a switching component, a loudspeaker component, or the like.

Component 108 is welded with the recesses of component 100, i.e., particularly with floors 100 and 104', as shown in FIGS. 1 and 2.

Additionally, component 100 may also include one or several recesses, which may be formed similarly to recess 102 of FIGS. 1 and 2, in order to form ultrasound welding connections of the type shown in FIGS. 1 and 2, for instance, with a door inner plate 142, in order to attach the component to the inside of the door.

REFERENCE LIST

100 Component
102 Recess
104 Floor
104' Floor
106 Opening
108 Component
112 Protrusion
114 Protrusion
116 Sonotrode
118 Work area
120 Peak
122 Area 124 Area
126 Center axis
128 Ultrasound oscillation
130 Side
132 Side
134 Side
136 Side
138 Side area
140 Side area
142 Door inner plate

The invention claimed is:

1. A method for ultrasound welding of a first and a second component, whereby the first component has a recess for the reception of first and second protrusions of the second component, the method comprising the following steps:
   Positioning of the first and second components so that the first and second protrusions protrude into the recess and touch a floor of the recess,
   Transmission of an ultrasound oscillation for the generation of a relative movement between the first and second components, whereby the floor is pressed against the first and second protrusions, so that first protrusion is deformed in a first direction and second protrusion in a direction opposite to the first direction, and at least a first welding connection between the first recess and the floor and a second welding connection between the second recess and the floor is formed.

2. The method of claim 1, wherein the recess is formed as a trapezohedron.

3. The method of claim 1, wherein the recess has a depth between approximately 7 mm and 25 mm, particularly approximately 15 mm.

4. The method of claim 1, wherein one opening of the recess has a width of approximately between one of: 4 mm and 32 mm, and 8 mm to 16 mm.

5. The method of claim 1, wherein a wall thickness of the recess is one of: approximately between 1 mm and 6 mm, and approximately 3 mm.

6. The method of claim 1, wherein the first and second protrusions run substantially parallel to each other before the transmission of the ultrasound oscillation.

7. The method of claim 1, wherein the first and second protrusions are positioned substantially perpendicularly to the second component before the transmission of the ultrasound oscillations.

8. The method of claim 1, wherein the wall thickness of the protrusions is one of: approximately between 1 mm and 6 mm, and approximately 3 mm.

9. The method of claim 1, wherein a distance between the first and second protrusions corresponds to approximately 0.5 to 1.0 times the width of an opening of the recess.

10. The method of claim 1, wherein the first and second protrusions have essentially substantially the same length.

11. The method of claim 1, wherein the recess and the first and second protrusions are arranged substantially symmetrically after the positioning.

12. The method of claim 1, wherein the ultrasound oscillation is transmitted to the first component by means of a sonotrode.

13. The method of claim 12, wherein the sonotrode has a work area with a peak, and wherein the sonotrode is placed with its peak on the backside of the floor of the recess between the first and second protrusions.

14. The method of claim 13, wherein at the work surface of the sonotrode, two approximately half-wave formed surfaces are formed, which originate from peak.

15. The method of claim 12, wherein the work surface of the sonotrode is formed symmetrically.

16. The method of claim 1, wherein the first component is a carrier plate.

17. The method of claim 1, wherein the second component is a carrier plate.

18. The method of claim 1, wherein a third welding connection is created between the first protrusion and a first flange of the recess and a fourth welding connection between the second protrusion and a second flange of the recess.

* * * * *